June 9, 1925.  1,541,379
W. E. PEARL
COLLAR
Filed April 15, 1922
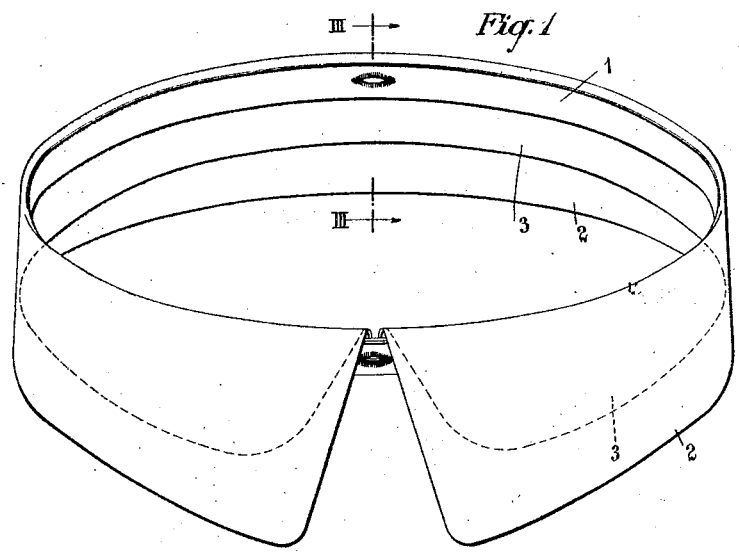
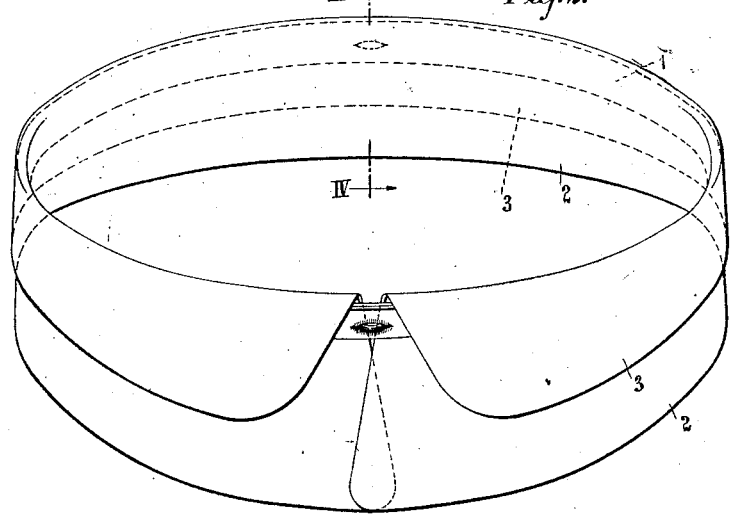
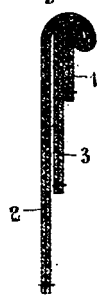 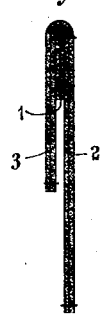
INVENTOR
William E. Pearl
ATTORNEYS Patented June 9, 1925.

1,541,379

UNITED STATES PATENT OFFICE.

WILLIAM E. PEARL, OF BROOKLYN, NEW YORK.

COLLAR.

Application filed April 15, 1922. Serial No. 553,003.

*To all whom it may concern:*

Be it known that I, WILLIAM E. PEARL, a citizen of the United States, and resident of the borough of Brooklyn, in the city and State of New York, have invented a new and useful Improvement in Collars, of which the following is a specification.

This invention is particularly directed to improvements in soft collars, the object being to provide a collar band and a pair of turned down collars so arranged that the outer turned down collar which covers and protects the inner turned down collar may be turned inwardly over the collar band, out of the way, to expose the inner turned down collar in its proper position for use.

By this arrangement, not only may the outer turned down collar be turned out of the way when it becomes soiled or mussed, but where the collars are of different styles, the outer collar of one style may be turned out of the way to expose the inner collar of another style, thus giving the wearer a choice of two styles.

A practical embodiment of my invention is represented in the accompanying drawings, in which—

Fig. 1 represents a detail front view with the outer collar exposed in its proper position for use.

Fig. 2 represents a similar view with the outer collar turned inwardly, out of the way and the inner collar exposed in proper position for use.

Fig. 3 represents an enlarged section taken in the plane of the line III—III of Fig. 1.

Fig. 4 represents an enlarged section taken in the plane of the line IV—IV of Fig. 2.

The collar band is represented by 1. A pair of turned down soft collars 2, 3 are sewed to the collar band in such a manner that both collars may be located exterior to the collar band or the outer collar inside the collar band and the inner collar outside the collar band.

The outer turned down collar 2 is preferably deeper and longer than the inner turned down collar 3, so that when the outer collar is in its exposed position for use, it covers and protects the inner collar.

When it is desired to expose the inner turned down collar in its proper position for use, as for instance when the outer turned down collar has become soiled or mussed, the outer turned down collar is turned inwardly out of the way.

The two turned down collars may be of different styles so that either style may be exposed for use by leaving the outer collar in its normal exposed position or by turning it inwardly out of the way.

In the construction herein shown, the turned down collars are formed from two properly shaped strips of material sewed together along their edges and the collars are sewed along an intermediate line to the collar band in such a manner that the turned down outer collar may be readily turned from its exposed position, for use, inwardly, out of the way, when so desired.

From the above description it will be seen that I have provided a collar construction which will be very much more durable than a single collar, for the reason that the number of times that the collar construction will have to be laundered, is materially decreased.

It is evident that various changes may be made in the construction, form and arrangement of the several parts without departing from the spirit and scope of my invention, hence I do not wish to be limited to the particular embodiment herein shown and described, but

What I claim is:—

In combination, a collar band, a strip of material initially folded intermediate its ends over and suspended by said band, and constituting thereby a pair of collars of different styles, one of said collars being deeper and longer than the other of said collars, said longer and deeper collar and said band being secured together by stitching together their adjacent upper edges whereby the longer of said collars may be folded backwardly upon itself to substantially the point of the stitching and thereby overlying and concealing the shorter of said collars.

In testimony, that I claim the foregoing as my invention, I have signed my name this 14th day of April, 1922.

WILLIAM E. PEARL.